Reed & Fowle.
Earth Closet.
No. 90,688. Patented Jun. 1, 1869.
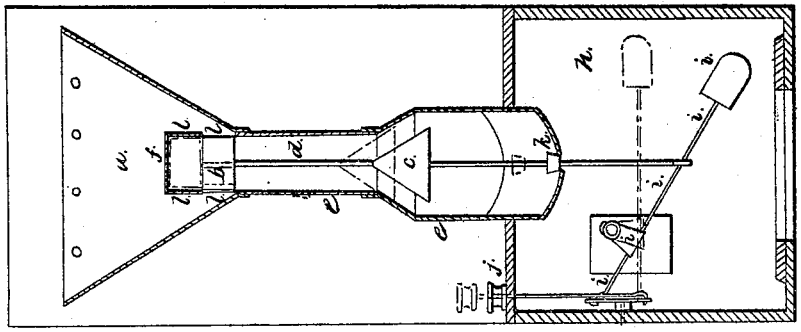
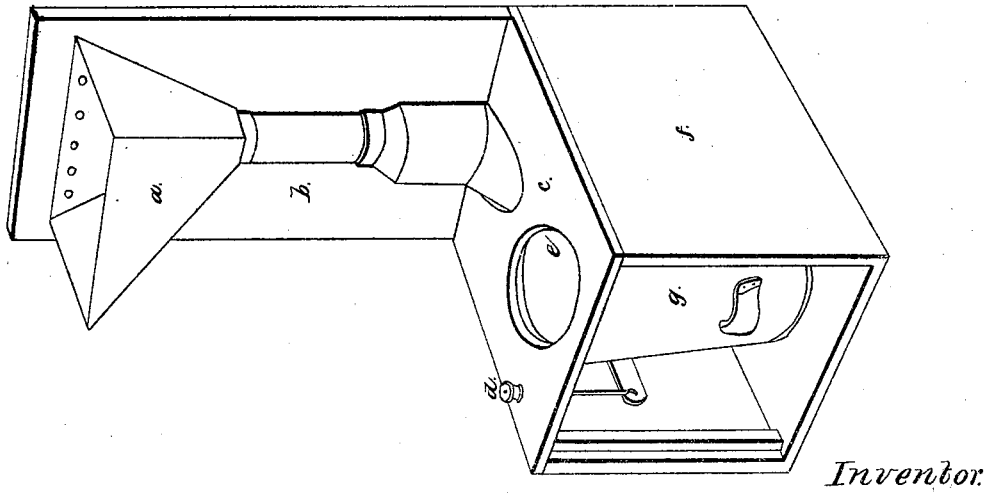
Witnesses.
H.M. Hurlstun
Robert Wiggin
Inventor.
H.J. Reed
Joseph E. Fowle
by their attorneys B.A. Williams & Son

UNITED STATES PATENT OFFICE.

H. O. REED AND JOSEPH W. FOWLE, OF BOSTON, MASSACHUSETTS.

IMPROVEMENT IN DRY-EARTH WATER-CLOSETS.

Specification forming part of Letters Patent No. 90,688, dated June 1, 1869.

*To all whom it may concern:*

Be it known that we, H. O. REED and JOSEPH W. FOWLE, both of Boston, in the county of Suffolk, State of Massachusetts, have invented an Apparatus for the use of Dry Earth, which we style a "Dry-Earth Closet;" and we hereby declare that the following, taken in connection with the drawings which accompany and form a part of this specification, is a description of our invention, sufficient to enable those skilled in the art to practice it.

Dry earth is recognized as one of the best, if not the best, deodorizing and absorbing substance known, and our closet is designed to use the earth instead of water in privies, or in privies where water is not used. By this means all unpleasant odor is avoided, and the earth-closet can be used in the house, in the sick-room, or in the hospital without the necessity of any fumigating or purifying substances.

Figure 1 in the accompanying drawing represents the dry-earth closet in its exterior appearance. $a$ is the hopper which contains the dry earth. $b$ is the conductor which allows the earth to pass down into the pan $g$ in the box beneath the seat. $c$ is the seat upon which the person using the closet sits. $d$ is the knob with which the person raises or moves the valves which allow the earth to pass down. $e$ is the hole in the seat. $f$ is the box which contains the receiving-pan and the apparatus for moving the valves. $g$ is the pan beneath the hole.

Fig. 2 represents the dry-earth closet in its interior and minute parts. $a$ is the inside of the hopper which contains the dry earth. $b$ is the upper valve, which, in its present position prevents the earth in the hopper from passing into the openings in the sides of the socket $l$, and passing down the conductor $e$, thence into the pan below. $d$ is the valve-rod which connects the valves together.

The valve $c$, when up in its place, confines the earth which has passed down through the openings in the sides $l$ of the upper socket. When the valve $c$ drops down, the earth between the valves is allowed to pass down into the pan beneath.

$k$ is a small valve, which closes the hole in the lower part of the conductor immediately above the pan. $j$ is the knob which the person uses to operate the machinery $i$, all of which is on the usual plan of fixtures in ordinary water-closets.

The deposits in the pan are thus covered by the earth, and by a chemical change all unpleasant odor is destroyed and the excrement absorbed. These deposits, in connection with the dry earth, produce a most excellent and valuable fertilizer.

We claim as our invention—

The apparatus described in Figs. 1 and 2, including the application and combination of the valves and valve-rod inclosed in the conductor $e$, in the manner and for the purposes shown and set forth.

JOSEPH W. FOWLE.
H. O. REED.

Witnesses:
H. W. WILLIAMS,
R. A. WIGGIN.